United States Patent [19]

Pauls et al.

[11] Patent Number: 5,672,631

[45] Date of Patent: Sep. 30, 1997

[54] METHOD FOR PROCESSING PACKAGING REMNANTS WITH RECOVERY OF MATERIALS

[76] Inventors: Mathias Pauls, Mooshaldenstrasse; Torsten Kellner, Rinkenbachstrasse, both of Appenzell, Switzerland, CH-9050

[21] Appl. No.: 627,914

[22] Filed: Apr. 2, 1996

Related U.S. Application Data

[63] Continuation of Ser. No. 137,187, Mar. 28, 1994, abandoned.

[30] Foreign Application Priority Data

Apr. 24, 1991 [DE] Germany ............... 41 13 397.8

[51] Int. Cl.$^6$ ............... C08J 11/04; C08J 3/00; B01D 1/00
[52] U.S. Cl. ............... 521/49; 521/49.5; 524/235; 422/286; 422/292; 422/901
[58] Field of Search ............... 521/49, 49.5; 524/235; 422/292, 286, 901

[56] References Cited

U.S. PATENT DOCUMENTS

| | | | |
|---|---|---|---|
| 3,708,440 | 1/1973 | Frulla et al. | 521/49.5 |
| 3,734,776 | 5/1973 | Keogh, Jr. | 134/13 |
| 3,983,087 | 9/1976 | Tuerer et al. | 521/49.5 |
| 4,014,809 | 3/1977 | Kondo et al. | 252/182 |
| 4,162,995 | 7/1979 | Sheratte | 521/49 |
| 4,267,078 | 5/1981 | Lidy et al. | 521/49 |
| 4,339,358 | 7/1982 | Schütz | 521/49.5 |
| 4,511,680 | 4/1985 | Niederdellmann | 521/49 |
| 4,809,915 | 3/1989 | Koffsky et al. | 241/36 |
| 4,844,106 | 7/1989 | Hunter et al. | 134/73 |

FOREIGN PATENT DOCUMENTS

| | | | |
|---|---|---|---|
| 208 660 | 1/1987 | European Pat. Off. . | |
| 359 106 | 3/1990 | European Pat. Off. . | |
| 422 501 | 10/1990 | European Pat. Off. . | |
| 546415 | 6/1993 | European Pat. Off. | 521/49 |
| 37 14312 | 4/1987 | Germany . | |
| 02023/24 | 7/1988 | Germany . | |
| 3817273 | 1/1989 | Germany . | |
| 0023638 | 2/1982 | Japan | 521/49 |

*Primary Examiner*—Paul R. Michl
*Assistant Examiner*—Olga Asinovsky
*Attorney, Agent, or Firm*—Hazel & Thomas

[57] ABSTRACT

The invention concerns the method and apparatus for processing remnant-holding packagings while recovering substances of value, said method including the following steps: The packagings are inserted into an operational vessel 13, and the residues are extracted using a solvent. The residue-containing solution from the operational vessel 13 is transferred into a sump. The residue-holding solution is concentrated in the sump while the solvent is evaporated in an evaporation station 19. The evaporated solvent is condensed in a condensing station 20. The solvent is recycled from a recycling station 22 into the operational vessel 13. The residues are enriched and then recovered in concentrated form from the sump.

26 Claims, 3 Drawing Sheets

METHOD FOR PROCESSING PACKAGING REMNANTS WITH RECOVERY OF MATERIALS

This application is a continuation of application Ser. No. 08/137,187, filed Mar. 28, 1994 now abandoned.

DESCRIPTION

The invention concerns a method for processing used or noxious packaging remnants while recovering valuable substances, in particular from aerosol containers, for instance such as those used for polyurethane foaming, and further it relates to equipment with which to carry out the method.

Packaging-remnants that accumulate in large amounts, illustratively in the form of partly or fully emptied aerosol containers of chemical or industrial liquids and mineral-oil products, however also in the form of various-purpose filters such as motor-vehicle oil filters, are increasingly becoming a waste-disposal problem. Ecology prohibits disposal in trash dumps because the remnants therein will reach the atmosphere, the soil or ground waters and thus are likely to be highly damaging. Similar considerations apply to incineration which especially as regards chemical-industrial products will be incomplete when controllable at all by expensive measures. While incineration does much reduce the bulk, it does not solve the problem of ecological degradation.

This problem is discussed more comprehensively below in relation to the waste-disposal of aerosol containers holding prepolymers and used for producing polyurethane foams.

Polyurethane foams are applicable in many fields. In construction for instance, they are frequently used for sealing and insulation, and so they are also in other technical fields. As a rule, polyurethane foams are dispensed from aerosol containers holding a polyurethane prepolymer together with the required propellant and where called for with any required additives. These aerosol containers are pressurized and neither can nor may be re-used and accordingly must be disposed of. They entail therefore a problem in unconventional waste disposal. Moreover aerosol containers from earlier production dates contain conventionally fluorinated hydrocarbons which are considered to be damaging to the ozone layer and therefore ought not to reach it.

Steps are being increasingly discussed regarding controls on the domestic and professional wastes to the end that the producer shall be constrained to take back the packaging of its products and assures the re-use or elimination of such packaging. Such measures make it necessary to look for economical methods for the handling of such wastes.

When processing returned aerosol containers for purposes of manufacturing polyurethane foams, a number of problems arise which so far have precluded economic processing and recovery. Illustratively part of the returned containers remain appreciably pressurized because of the remaining propellant gas, thereby creating difficulties in both opening the container and its combustion. Moreover the containers are filled to different levels, ranging from being practically completely filled with prepolymer in over-aged containers that cannot be removed because of a blocked valve to practically completely empty with prepolymer remnants in the un-crosslinked to crosslinked state adhering to the edges. These differing conditions so far have prevented uniform processing and recovery of the remnants.

Accordingly, it is the object of the invention to create a method for processing packaging, illustratively containers containing polyurethane prepolymers especially for the purpose of foam generation, and for recovering the materials of worth therein, while avoiding the uncontrolled release of contained materials damaging to health and the ecology.

This problem is solved by the invention by a method of the initially cited kind which comprises the following steps carried out in parallel:

Introducing the packaging into an operational vessel and extracting the residues with a solvent, Extracting the residues with a solvent, Transferring the solution containing the residues from the operational vessel into a sump, Concentrating the residue-holding solution in the sump while evaporating solvent, Condensing the evaporated solvent, Recycling the solvent into the operational vessel and following sufficient enrichment recovering the residues in concentrated form from the sump.

Preferably the packagings to be processed will be introduced, while being simultaneously opened, into the operational vessel. This can be achieved by a conventional sluice means assuring that the operational vessel is sealed relative to the environment.

If the packagings have not yet been opened, they will be appropriately inside the sluice means. Preferably this step takes place simultaneously with comminution, for instance in a comminution apparatus designed for such a purpose. Hereafter this comminution is denoted by "shredding".

In an especially advantageous manner, the opening or shredding of the packagings will take place in the presence of spraying with solvent. On one hand foaming is prevented thereby, and on the other hand any water introduced will be absorbed and spread by the solvent before being able to enter into uncontrollable reactions with the ingredients, this feature being particularly significant with respect to moisture-sensitive materials, especially moisture-crosslinking polyurethane prepolymers.

The shredded packagings thereupon are received in the operational space of a conveyor, preferably a screw conveyor suitable to separate solids from liquids and solutions. If the packagings are ferromagnetic, magnetic conveyance may also be considered. Combinations of both conveying means also may be appropriate, especially when tin-plate cans are fitted with plastic, as is frequently the case with aerosol containers.

The extraction of the residues in the opened or comminuted packagings takes place in the operational vessel using a solvent matched to the particular residues. Suitable solvents always shall be such as were used in the manufacture of the original packaging contents and/or such as are still present in the packagings themselves.

Extraction may be carried out for instance in that the opened and/or comminuted packagings drop into the operational vessel filled with solvent and remain there for some time before being moved on. In parallel with or alternatively to this procedure, the packagings already may be sprayed and washed with fresh solvent during comminution and/or during conveyance. Appropriately the packagings shall make contact with the solvents in all three stages, that is they shah be sprayed both during comminution and conveyance and further be in contact with the solvent in the operational vessel, for instance in the hopper of a conveyor screw.

Following removal, the solid residues are dried in arbitrary sequence and taken out of the sluice. The solid residues are then sorted and fed to the recovery station.

Especially suitable solvents are conventional esters, ketones, aliphatic and aromatic hydrocarbons and their derivatives, in particular those with a boiling point up to about 200° C. Where containers with polyurethane prepolymers are being processed, acetone and toluene will be especially applicable solvents.

When preparing spray-, pressurized- and aerosol-containers holding remnants, substantial amounts of propellant gases may be present which should not escape into the atmosphere. Appropriately in such cases the released propellant shall be collected and condensed in suitable manner. Such condensation might be implemented by compressed liquefaction, however also by condensation at low temperatures. Such a procedure is especially suitable for liquefying propellant gases, also for fluorinated hydrocarbons of low boiling points or such combustible hydrocarbons as propane or butane.

In the invention the residue-holding solution obtained from the operational vessel is transferred into a sump, for instance by pumping, the solution being concentrated further in this sump. For that purpose, the solution's temperature is raised and the solvent is distilled off the sump. Where called for, reduced pressure may be used to lower the boiling point and to prevent mixing the residues. The solvents removed by distillation are condensed and following any required purification are recycled into the procedure. Following sufficient concentration, the residues in the sump are removed and then undergo further recovery.

In the event the method of the invention is applied to processing aerosol containers with polyurethane prepolymers, a conventional thinner shall be appropriately added to increase the fluidity of the prepolymer collecting in the sump. Such a thinner should evince a higher boiling point than the particular solvent being used. Triethyl phosphate or fresh raw materials similar to those initially filling the packagings are especially applicable.

Appropriately the method of the invention is carried out in an inert atmosphere, preferably nitrogen or argon. Other applicable inert gases are combustion gases containing $CO_2$, or $CO_2$ itself, and the like, the foremost desideratum being the displacement of the oxygen within the scope of the method of the invention in order to prevent explosive mixtures. When pure nitrogen or pure argon is used, the inert gas appropriately shall be made to circulate, gases entrained by the inert gas, for instance propellants and evaporated solvents, being condensed at suitable condensation stations. The same inert-gas effect also may be obtained from incombustible gases released from the aerosol containers.

The method of the invention offers the particular advantage that it can be carried out continuously and with only a few modifications for a plurality of commercial packagings. Some applicable fields were mentioned initially, without thereby implying limitation of applicability.

Illustratively the method of the invention allows processing remnants containing polyurethane polymers from aerosol containers and other receptacles and to recover them in a worthwhile form and simultaneously to obtain the container raw-material in relatively pure form suitable for re-use or for deposit in trash-dumps. The prepolymer accumulating in increasingly concentrated form in the sump during the implementation of the method of the invention may be used for a plurality of purposes. For instance when dissolved in toluene or another solvent, the prepolymer may serve as a binder in compound materials or as adhesive agent when making molded parts from recycling products, such as when making plastic panels from granulated old tires.

In the implementation of the method, first the residues held in the receptacles or aerosol containers are fed into the operational vessel and made to dissolve in the solvent therein. By feeding the residues into the operational vessel and by returning the evaporated solvent, the volume held therein exceeds an operational volume at which the solution is transferred from the operational vessel into the sump. On the whole a constant volume of solvent and dissolved residue is present in the operational vessel.

By means of a suitable medium, the sump is heated until its solution boils and solvent is continuously distilled off. This solvent is condensed by a coolant and is returned directly or indirectly into the operational vessel, whereby fresh solvent is constantly available therein to dissolve the introduced residues. The residues fed into the operational vessel are continuously extracted with solvent in this manner. The extracts are enriched in the sump because the solvent therein is continuously expelled and said extracts are recovered from there following adequate enrichment. From time to time, insoluble residues remaining in the operational vessel will be removed from it.

In an especially advantageous manner, the method of the invention may be used to recover aerosol-container prepolymers for the purpose of making polyurethane foam. The aerosol container may be emptied through an adapter into the operational vessel. However, opening and extraction in the very operational vessel is advantageous. Preferably the aerosol container shall be comminuted inside the operational vessel in a suitable device such as a shredder. As a rule, the aerosol containers are tin-plate cans and therefore the comminution residues may be magnetically removed from the operational vessel, though also by means of a conveyor screw as mentioned above.

In a preferred mode of implementation, the transfer of solvent from the operational vessel into the sump takes place through an overflow. The solvent level in the operational vessel is below the aperture of a communication means running slightly downward into the sump, as a result of which, upon feeding extraction material into the operational vessel, the solvent drains through the communication means into the sump. Industrially, transfer by pump and conduit will be called for.

In a further preferred mode of implementation, the solvent distilled from the sump is directly condensed above the operational vessel, whereby the condensate drips back into the operational vessel or else drains away. Thereby ever fresh solvent will be available in the operational vessel, this solvent evincing the dissolution capacity required to absorb the residues. The constant supply of solvent moreover assures that the prepolymer concentration shall not become excessive in the operational vessel.

If the solvent distilled out of the sump is condensed directly above the operational vessel, then preferably the shredder residue will be removed by the flow of the draining or dripping solvent. Thereby prepolymer residues or adhering solution will be flushed away and optimal purification will be achieved.

Suitable extraction solvents are in particular esters, ketones, aliphatic or aromatic hydrocarbons or their derivatives with a boiling point up to 200° C. Especially suitable are the alkylesters of monocarboxylic acids and ketones, each with up to 8 C atoms, further alkylbenzenes with up to 10 C atoms. Acetone, butanone, toluene and xylenes are especially preferred. If the extracted prepolymer thereupon shall be used in adhesives, preferably toluene will be used, polyurethane based adhesives frequently being in toluene solutions. Moreover solutions of polyurethane prepolymers in toluene evince a comparatively low viscosity.

A thinner may be placed in the sump flask to improve or ensure the fluidity of the transferred and thereupon enriched prepolymers. If the thinner is added already at the beginning of extraction, it must have a higher boiling point than the solvent so that it shall not become leaner in the course of extraction. Conventional thinners for prepolymers are trialkyl phosphates, in particular triethyl phosphate, or others among the raw materials corresponding to the initial ones.

According to another preferred mode of implementation of the method of the invention, the propellant still held in the aerosol containers and which as a rule consists of fluorinated chlorohydrocarbons, partly halogenated hydrocarbons, dimethylether, propane, butane etc., also shall be collected and recovered. For that purpose, the gas flow issuing from the operational vessel may be compressed to liquefy the propellant gases contained therein. Alternatively the propellants may be condensed by cooling and be collected in a cooling trap.

The method of the invention is suitable both for batchwise and for continuous operation. In light of the substantial capital costs potentially involved, continuous operation is recommended.

Furthermore the invention concerns equipment with which to carry out the method of the invention. Such equipment comprises an input sluice, apparatus for opening the packagings inside the sluice, a collection receptacle for the opened packagings, at least one supply conduit for fresh solvent and inert gas, a drain for solvents containing soluble packaging residues, a conveyor for solid packaging residues, and at least one spray device pointing at the apparatus opening the packagings. Also peripheral devices for recovering the solid and dissolved packaging materials are hooked up, further separators for any propellant gases released from the packagings.

The means employed in the apparatus for opening the packagings inside the sluice appropriately consists of a conventional shredder with two mutually oppositely rotating drums fitted with knives. It is mandatory that such a shredder or any other apparatus suitable for opening the packagings be sprayed with solvent during the container-opening procedure in order to immediately absorb into the solvent the residues released at container-opening. In this manner foaming and bonding will be averted if propellant gases are present in the container. At the same time, water adhering to the packagings or having penetrated them will be spread by said spraying and thus prevented from reacting in an uncontrolled manner with the released packaging contents. This is especially important when processing packagings holding polyurethane prepolymer which may crosslink in uncontrolled manner in an the presence of humidity and cause the opening apparatus to bond shut. When adequate quantities of solvent are present, the concentration of the introduced water may be reduced to such an extent as to preclude any uncontrolled reaction. Crosslinking reactions that do take place nevertheless can then be kept within tolerable limits.

Appropriately at least one spray device shall be present above the opening apparatus. Especially advantageously, at least one spray device shall deposit solvent from above and below on the opening apparatus. Following said opening, the packagings together with the solvent deposited on them move into a collecting and extracting receptacle wherein the liquid or dissolved ingredients are removed through a conduit and the solid packaging residues are conveyed away.

Appropriately, the conveyor consists of a conveying screw entering the lower part of the collecting receptacle filled with solvent and conveying the solid ingredients located there. This conveying screw preferably is sprayed with fresh solvent by one or more spray nozzles to rinse adhering solution from the conveyed packaging residues. The rinsed material then passes through an appropriate drier and next issues from an outlet sluice of the apparatus to be routed to further sorting and utilization.

Appropriately, the solvent used in the equipment of the invention is made to circulate. TMs requires continuously withdrawing solvent from the extracting and collecting receptacle, to rid it by distillation from its dissolved contents and following condensation to return it through a set of conduits, through the spray devices and where applicable through the rinsing system into the apparatus.

When processing packagings holding combustible and/or reactive substances, the equipment will be loaded with inert gas. The inert gas is introduced through a duct appropriately in the vicinity of the opening apparatus and it is removed from the extracting receptacle and operational vessel and/or the drier. For economy the inert gas may be made to circulate. Appropriately, means shall be provided in the inert-gas circuit to remove aerosols, humidity, entrained propellant gases and absorbed solvent portions.

If the equipment is run under inert gas, the sluices appropriately shall be supplied with inert gas through separate conduits.

The invention is elucidated below by means of the Figures showing preferred modes of implementation.

Figure 1:
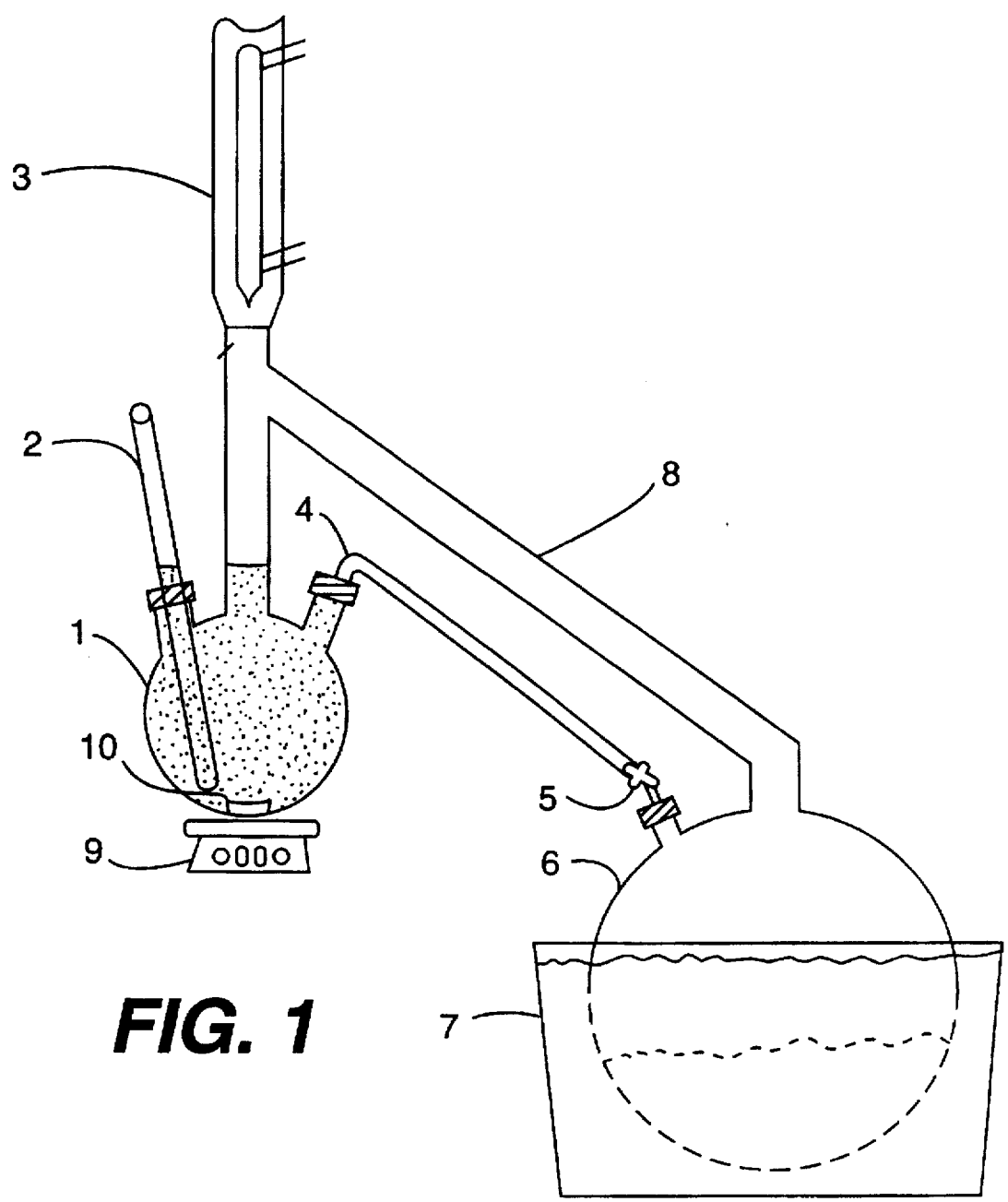
FIG. 1 is a laboratory recycling apparatus shown for illustration.

FIG. 1 shows lab-scale recycling apparatus for polyurethane propellants. The extraction solvent is present in a three-neck flask 1 with a supply conduit 2 and an overflow 4, further with a rising tube ending in a reflux condenser 3. The contents from incompletely discharged aerosol containers for PU foaming are fed through the supply conduit 2 and an adapter (not shown) to said solvent. A hollow magnet 10 displaced by a magnetic stirrer 9 ensures continuous mixing.

Commensurately with the quantity of material entering the three-neck flask, the solution from the flask 1 passes through the overflow 4 into the sump flask 6. A stopcock 5 assures that the solvent supply can be interrupted. The sump flask 6 is heated by a heating bath 7 until the solution it contains boils. Evaporated solvent will be distilled off through a tube 8 into the reflux condenser 3. The extract-free solvent condensed at the reflux condenser 3 drips into the operational flask 1 where it participates again in extraction while simultaneously implementing a transfer of solvent into the sump flask 6.

The implementation of the method of the invention in the above described equipment begins by preparing the operational flask 1 illustratively receiving acetone as the solvent. In parallel thereto, a slight amount of thinner, for instance triethylphosphate, also some solvent, is being placed into the sump flask 6, whereby the prepolymer accumulating therein remains fluid.

Thereupon the circulation is started. The sump flask 6 is heated to about 90° C. and the reflux condenser and the magnetic stirrer are started. Following about 15 minutes, equilibrium is achieved in the system circuit, that is, as much solvent as is evaporating from the sump flask 6 through the distillation bridge 8 into the reflux condenser 3 is also condensing therein and drips into the operational flask 1. From there, the solvent returns through the overflow 4 and the stopcock 5 into the sump flask 6. The circuit is closed.

As soon as equilibrium has been achieved, PU foam is introduced through the feed tube 2 and through an omitted adapter into the operational flask 1. The foam dissolves at once therein, the prepolymer goes into solution, and the propellant gas escapes through the condenser 3 at the upper end of which it is separated by an omitted cold trap. The introduced prepolymer volume flows in the form of a thinned solution through the overflow 4 into the sump flask 6. Therein the prepolymer is enriched to the same extent as PU foam is being sprayed through the feed tube 2 into the operational flask 1 and is being transferred in a thinned solution into the sump flask. The volatile solvent on the other hand is circulating and is constantly returned from the sump flask into the operational flask.

Near the end of the procedure, a mixture of prepolymer and solvent rich in prepolymer forms in the sump flask 6. By closing the stopcock 5, new solution is precluded from flowing into the sump flask, so that continuation of distillation leads to further concentration of this prepolymer. Once the desired concentration, i.e., enrichment, has taken place, the prepolymer will be removed from the sump flask.

Inherently, enrichment in the sump flask is not confined to the prepolymer component from the aerosol containers but also is the case for the additives and catalysts present therein. To the extent that the product shall be re-used to form polyurethanes, these further substances do not interfere; but with respect to other purposes they may be removed at least in part by distillation under standard pressure or vacuum or by extraction using solvents not affecting or reacting with the prepolymer.

It is clear that such equipment also can be used for other types of packaging without modification or with only a few.

Figure 2:
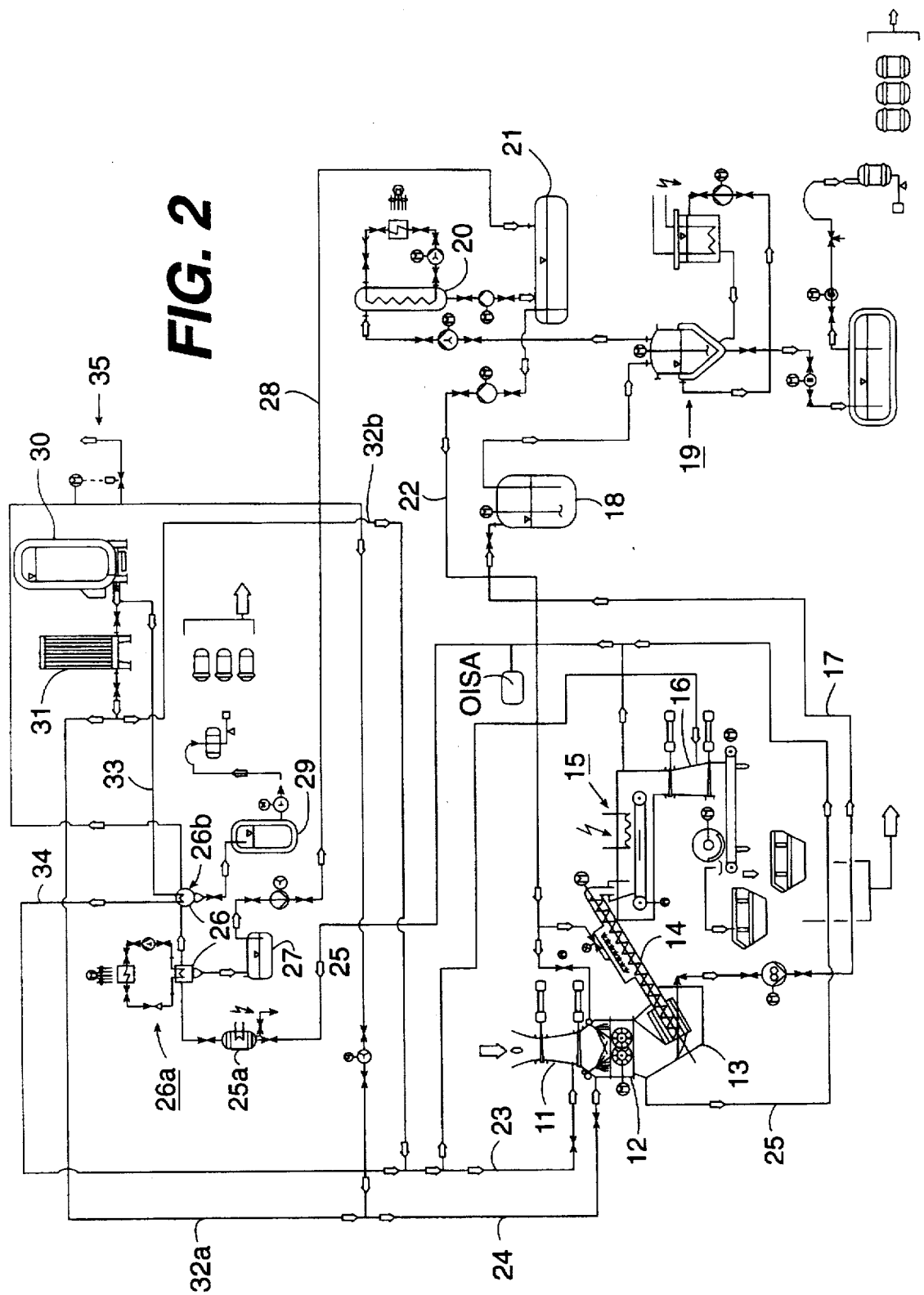
FIG. 2 is industrial equipment shown as a process schematic.

FIG. 2 schematically shows the procedural sequence of equipment operated by the method of the invention for recovering prepolymers from prepolymer-containing packagings, especially aerosol containers. However the method is also applicable to processing other types of packagings by resort to modifications at once obvious to the expert, for instance to processing motor-vehicle oil filters, in which case obviously there will be no recovery of propellants.

The equipment shown in FIG. 2 consists of three sections, namely mechanical processing, prepolymer recovery and propellant recovery. In the mechanical processing section, the introduced packagings first move past an intake storage and arrive to the feed station where the packagings are rid of foreign substances and plastic parts, and further are pre-dried. Being metered by weight they are moved through an intake sluice 11 to a comminution station 12 wherein they are sprayed with solvent and shredded and transferred into an operational vessel 13. The shredded packagings are washed with solvent and rid of soluble ingredients in the vessel 13. The solid ingredients are moved away by a conveyor 14 while being constantly sprayed with solvent. Then, the solid ingredients are moved to a drier 15, whereupon they pass through, and out of a sluice 16, and are no longer a part of the method of the invention. The solvent evaporated in the drier 15 is condensed and recycled into the method. After being removed from the loop of the method, the comminuted solids are sifted according to material and then are moved to the recovery stage.

The solvent together with the residues dissolved in it and collected in the operational vessel 13 is moved through the conduit 17 into a receiving flask 18 from where the solution passes to the evaporation stage. The solvent is distilled off here, if called for under reduced pressure. The distillation residue is withdrawn and treated and conditioned with a view of its further application and its return to the economic sector. No-longer-useful residues might be fed to incinerators or be deposited as concentrates in trash dumps.

The solvent distilled off the evaporation stage 19 is condensed in a condensing stage 20 and is returned through a supply tank 21 and a conduit 22 to circulation. Solvent losses are compensated by solvent replenishment. The condensed solvent returns from the supply tank 21 through spray devices (FIG. 3) into the comminution stage 12 and by means of the conveyor 14 into the operational vessel 13.

The comminution in the shredder 12 takes place, as do extraction and distillation, in an inert atmosphere, in the present instance nitrogen being supplied through the conduits 23 and 24 of the sluice 11 and the comminution stage 12. The gas portion accumulating during comminution is fed together with the flow of inert gas through the conduit 25 and, where called for, an aerosol separation stage and a drier 25a, to a condensing stage 26. In said condensation stage 26, a first stage 26a separates entrained solvents which are fed to a reservoir 27 communicating through the conduit 28 with the solvent tank 21 of the condensation stage 20, and in a second stage 26b, the propellants are condensed and recovered and collected in a tank 29. Furthermore the propellant portions accumulating from the solvent evaporation stage 19 may also be fed into the propellant condensation stage. Following propellant condensation, the inert gas is recycled and where called for, it will be replenished from the supply tank 30 through the conduit 32a after having crossed an evaporator 31. The sluices 11 and 16 each are supplied through conduits 32b and 34 with inert gas from the liquefied gas tank 30.

Appropriately, the condensation of propellants from the inert gas of the conduit 25 takes place in the condenser 26b by means of fresh inert gas in the cold to liquid state delivered by the liquefied gas tank 30 through the conduit 33, said inert gas then being fed through the conduits 34 and 23 into the sluice 11. Upon condensing in the condensation stage 35, excess inert gas is released into the atmosphere.

Figure 3:
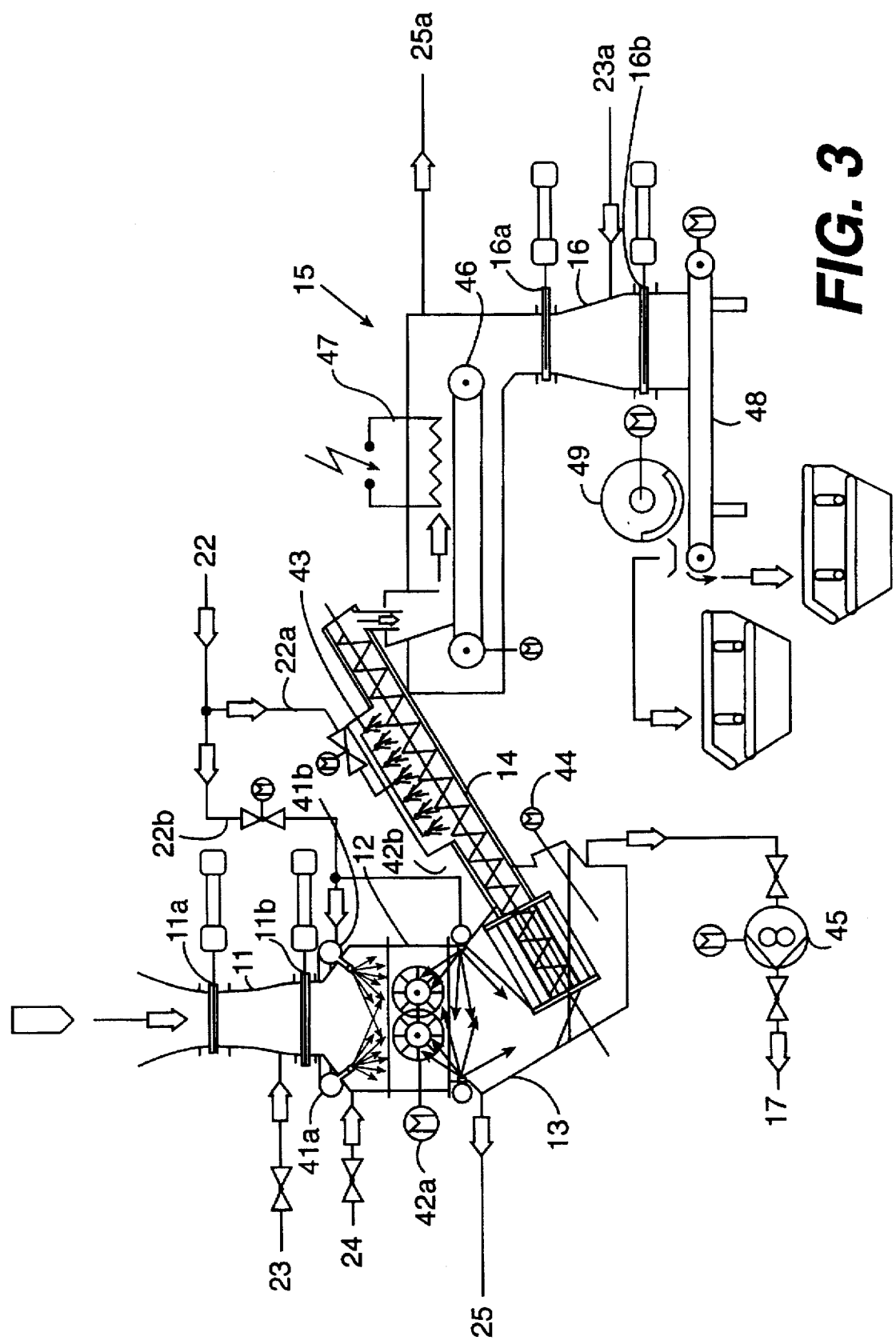
FIG. 3 is a detailed view of the equipment shown in FIG. 2.

FIG. 3 shows equipment of the invention for mechanically processing remnant-holding packagings. This equipment consists of a material hopper feeding a sluice 11 filled by a slider 11a with packagings to be processed and which by means of a second slider 11b feeds the introduced packagings into the equipment proper. The sluice 11 is loaded through the conduit 23 with an inert gas, in particular nitrogen.

The opening, i.e., shredder, apparatus is located underneath the sluice 11 and consists of two drums driven by a motor M into mutually opposite directions of rotation, said drums comminuting the introduced packagings by means of knives or the like mounted on them. Two spray nozzles 41a and 41b are located above the shredder and provide solvent to the top sides of the rotating drums. In a similar manner solvent is fed through spray nozzles mounted underneath the shredder drums to the shredded packagings.

The spray nozzles 41a, 41b and 42a, 42b are supplied with fresh solvents from the conduits 22 and 22b and, following spraying, said solvent together with the comminuted material arrives at the extracting and operating vessel 13 below the comminution apparatus 12. The vessel 13 holds the mixture of solvent and extract together with the solid packaging components. A motor-driven agitator 44 ensures thorough contact between the solid packaging residues and the solvent and effective extraction. The extract is removed from the vessel 13 through the conduit 17 using a motor-driven pump 45 and is moved into the supply tank 18 of the prepolymer recovery stage.

A screw conveyor 14 serves to remove the solid packaging residues from the vessel 13 and dips by its lower end into the mixture of solvent and extract. To render the solid packaging residues free from extract, they are moved by means of the screw through a rinsing path comprising spray nozzles 43 mounted so as to point onto the screw. The spray nozzles 43 are supplied through the solvent feed conduits 22 and 22a with fresh solvent. The solvent sprayed onto the screw conveyor 24 passes into the vessel 13.

The solid packaging residues moved by the screw conveyor 14 pass through a hopper to enter a drier 15 wherein a conveyor belt 46 moves the solid residues underneath a heater 47. From there the conveyed material passes into an exit sluice 16. The exit sluice is sealed by a slider 16a from the equipment of the invention and by a slider 16b in order to process the solids. Inert gas can be introduced through a conduit 23a into the sluice 16.

The processing section consists of a motor-driven conveyor belt 48 moving the conveyed material underneath a magnetic separator 49. Using this magnetic separator, the conveyed material is sorted in relation to its magnetic properties.

The equipment of the invention shown in FIG. 3 is operated in an inert atmosphere. The inert gas appropriately is nitrogen and is introduced through the conduit 24 into the comminution apparatus 12, and it is present throughout the entire equipment. Inert gas leaving the equipment loaded with solvent and possible also with propellant released from the packagings is removed through the conduit 25 from the vessel 13 and/or through the conduit 25a from the drying stage 15 of the solid packaging residues. Appropriately the inert gas is made to circulate in a closed loop because ecological constraints demand anyway that it be rid of the entrained propellant and solvent in the subsequent apparatus. As shown in part in FIG. 2, the inert gas is consecutively made to pass through stations for aerosol separation, moisture removal 25a and solvent condensation 26a, and it is fed to a propellant-separation station 26b before being returned into the circuit or before it is fed through a venting valve 35 into the atmosphere.

Appropriately all conduits are fitted with valves which, provided control of the flow of material therein is required, may be motor-driven. This applies in particular to the solvent supply conduits to the spray nozzles and rinsing stations of which the operation can be stopped as soon as the input or the removal of solid residues ceases.

The individual devices and equipment used in implementing the method of the invention are commercially available or may be designed by the expert by simple modification of, or matching to, known devices or equipment to achieve the desired operation.

We claim:

1. A method for the batch-wise or continuous processing of aerosol cans made of sheet metal holding polyurethane prepolymer remnants while recovering aerosol can material and said polyurethane prepolymer remnants therefrom, said method comprising the following steps:

introducing said cans into an operational vessel, said cans being opened thereby, and extracting said remnants using a solvent for dissolving polyurethane prepolymer remnants, thereby creating a residue-holding solvent;
   removing said opened cans from said operational vessel;
   transferring said residue-holding solvent from said operational vessel into a sump;
   concentrating said residue-holding solvent in said sump while evaporating said solvent and thereby forming an evaporated solvent;
   condensing said evaporated solvent;
   recycling said solvent into said operational vessel;
   following sufficient enrichment, recovering said remnants in concentrated form from said sump; and
   providing an inert gas atmosphere during processing of said aerosol cans, wherein at least said steps of opening said cans, extracting said remnants, evaporating said residue-holding solvent and condensing said evaporated solvent are conducted in said inert gas atmosphere.

2. Method defined in claim 1, wherein said containers are sluiced into said operational vessel while simultaneously being opened.

3. Method defined in claim 1, wherein said containers are being opened by shredding.

4. Method defined in claim 3, wherein said containers are shredded while being sprayed with said solvent.

5. Method defined in claim 1, wherein solid shredder residues are taken out of a sluice of said operational vessel by a conveyor.

6. Method defined in claim 5, wherein ferromagnetic shredder residues are magnetically conveyed out of said operational vessel.

7. Method defined in claim 5, wherein said shredder residues are sprayed with said solvent during conveyance.

8. Method defined in claim 1, wherein said solvent is selected from a group comprising: esters, ketones, aliphatic and/or aromatic hydrocarbons with a boiling point up to about 200° C.

9. Method defined in claim 8, wherein acetone or toluene are used as said solvents.

10. Method defined in claim 1, wherein said solvent is distilled from said sump under reduced pressure.

11. Method defined in claim 1, wherein gases contained in said containers are separated and recovered.

12. Method defined in claim 11, wherein said gases are condensed.

13. Method defined in claim 1, wherein said steps of introducing, transferring, concentrating, condensing, recycling and recovering are carried out in an inert gas atmosphere.

14. Method defined in claim 13, wherein said inert gas moves in a closed loop.

15. Method defined in claim 1, wherein said steps of introducing, transferring, concentrating, condensing, recycling and recovering are implemented continuously.

16. Method defined in claim 1, wherein a sufficient quantity of thinner is added to said sump to achieve fluidity and/or subsequent applicability of said residue-holding solvent.

17. Method defined in claim 16, wherein a boiling point of said thinner is higher than that of said solvent.

18. Processing equipment with which to carry out the batch-wise or continuous processing of aerosol cans made of sheet metal holding polyurethane prepolymer remnants while recovering aerosol can material and said polyurethane prepolymer remnants therefrom, said equipment comprising:

an intake sluice for inputting aerosol cans to be processed;
   means for opening said cans to be processed;
   an extracting and receiving vessel for storing opened cans;

means for extracting polyurethane prepolymer remnants from said opened cans, said extracting means including means for spraying solvent for dissolving said remnants;

at least a first supply conduit for supplying said solvent for containing said remnants to said extracting means;

at least a second supply conduit for supplying inert gas to form an inert gas atmosphere during processing of said aerosol cans;

a drain for draining said remnant-containing solvent from said vessel;

a conveyor means for conveying solid remnants of said opened cans after extraction of said polyurethane prepolymer remnants with said solvent;

an outlet sluice for removing said solid remnants of said opened cans; and means for recovering said polyurethane prepolymer remnants from said remnant-containing solvent, said recovering means including an evaporation stage for distilling off said solvent, a condenser station for condensing said distilled solvent, and a recycling station for recycling said condensed solvent, wherein said inert gas atmosphere is provided at least to said extracting and receiving vessel, said evaporation stage and said condenser station during processing.

19. Equipment defined in claim 18, wherein said means for opening of said cans is a shredder constituted by two cutter-drums rotating in mutually opposite directions.

20. Equipment defined in claim 18, wherein said spraying means includes at least one spray nozzle mounted above said container-opening means and points at said cans.

21. Equipment defined in claim 18, wherein said spraying means includes at least one spray nozzle mounted underneath said can-opening means and is directed at said cans.

22. Equipment defined in claim 18, wherein said conveyor means comprises a screw conveyor for removing said solid container remnants, said screw-conveyor being mounted to enter said extracting and receiving vessel.

23. Equipment defined in claim 22, wherein said spraying means includes nozzles for spraying said solvent mounted above said screw conveyor for solid container remnants and pointed at said residues.

24. Equipment defined in claim 23, wherein said conveyor means includes a drier section joining and following said screw conveyor.

25. Equipment defined in claim 18, further comprising separate inert-gas supply conduits in the vicinity of said intake and outlet sluices.

26. A method for the batch-wise or continuous recovery of container material and polyurethane prepolymer remnants from aerosol cans, the method comprising the steps of:

providing aerosol cans holding polyurethane prepolymer remnants;

providing a vessel for processing said cans;

introducing said cans into said processing vessel;

opening said cans in said processing vessel;

extracting said remnants from said cans using a solvent for dissolving said remnants to thereby create a remnant-holding solvent;

removing said opened cans from said processing vessel;

transferring said remnant-holding solvent from said processing vessel into a sump;

concentrating said remnant-holding solvent in said sump while evaporating said solvent to thereby form an evaporated solvent;

condensing said evaporated solvent;

recycling said solvent into said processing vessel; and recovering said remnants in concentrated form from said sump, said recovering step including enriching said remnants while in said sump; and providing an inert gas atmosphere during processing of said aerosol cans, wherein at least said steps of opening said cans, extracting said remnants, evaporating said residue-holding solvent and condensing said evaporated solvent are conducted in said inert gas atmosphere.

* * * * *